FRACTION-DECIMAL CALCULATOR

Filed July 15, 1965

INVENTOR.
CESAR M. DABLO
BY Beehler & Arant
ATTORNEYS

United States Patent Office 3,272,431

Patented Sept. 13, 1966

3,272,431
FRACTION-DECIMAL CALCULATOR
Cesar M. Dablo, 309 N. Boylston St., Los Angeles, Calif.
Filed July 15, 1965, Ser. No. 472,145
1 Claim. (Cl. 235—69)

Figure 1:
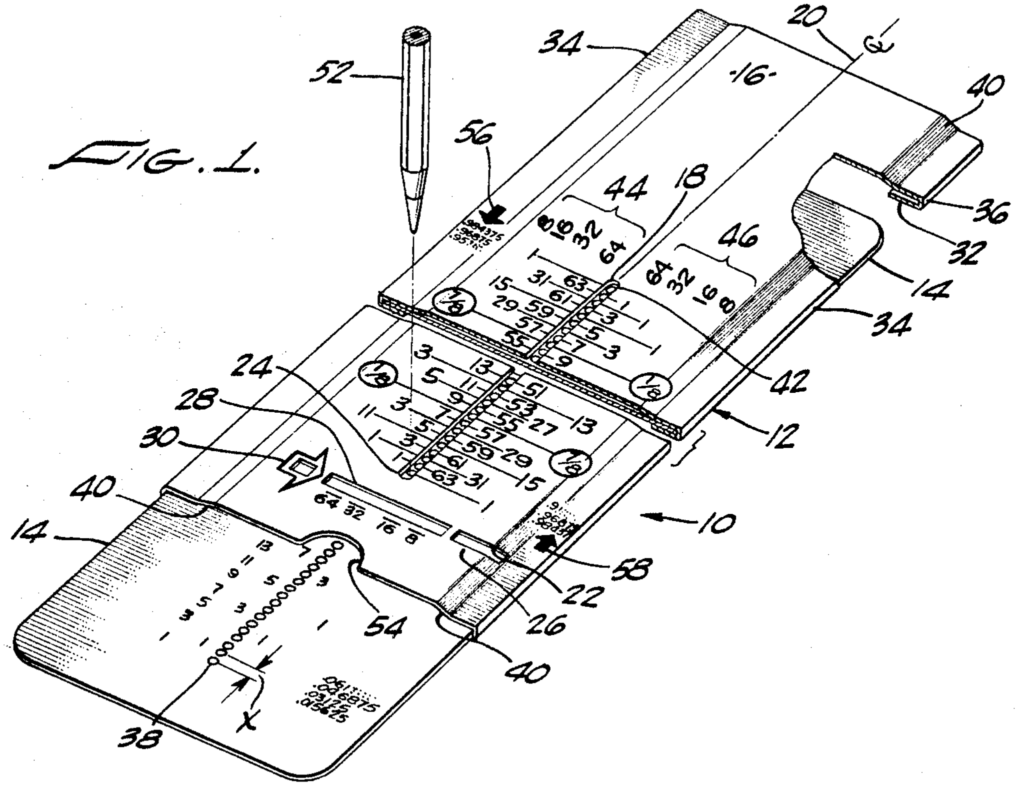

This invention relates generally to small calculators of the type carried on the person and more particularly to a manually operated fraction-decimal calculator for quickly and accurately adding and subtracting in any sequence two or more numbers.

Small manually operated calculators are frequently used in every day practice for many different purposes such as for example, the converting of any amount of money from one system of units to another such as dollars to pounds sterling. Or as another example, the computing of interest at different pre-selected rates according to various accepted methods. However, in not all areas of activity, areas wherein a need existing could be uniquely filled by an especially designed calculator, is this need actually satisfied. One such area, for example, is concerned with the task of quickly and accurately adding and/or subtracting numbers, generally numbers less than unity which may or may not be in the same form, namely in the decimal form or as a fraction. Such is the task, among others, of a machinist for example who quite frequently cannot take the time during the operation of a complex machine producing an equally if not more complex part to write down on paper the various steps or sequence of computations involved and for which an answer is needed immediately.

Not only does the present invention provide an inexpensive and complete solution for the machinist mentioned above, but the calculator according to the invention also permits all others who are interested in quickly and accurately adding or subtracting numbers, generally those less than unity, be they in fraction or decimal form, in some sequence random or otherwise. Moreover the calculator to be described is a relatively inexpensive device that can be operated simply without benefit of elaborate or formal instructions. Aside from being easily manipulated and very accurate, the calculator to be described may be formed of metal, sheet plastic or paper. If desired, copy for advertising purposes may be imprinted on the calculator as, for example, on the back surface thereof.

According to the invention, there is provided a calculator for adding and subtracting numbers in sequence comprising a base member having a planar surface, guide means extending along the sides of the base member, an elongated slot extending through the planar surface and parallel to the sides, and a window disposed transversely between the sides and extending through the surface near one end of the slot; in addition the calculator includes a slide member movably mounted in the guide means and including a scale graduated in decimal equivalents of successive fractions having a predetermined denominator, decimal equivalents and the corresponding fractions being arranged to appear simultaneously one at a time in the window as the slide member is moved, and a plurality of openings extending through the slide member having a diameter less than the narrow dimension of the slot, the openings being spaced a predetermined distance apart along a line parallel to the slot and lying within the plane passing orthogonally through the center of the slot.

It is a primary objective and purpose of this invention therefore to provide a very inexpensive device for adding and subtracting small numbers simply and quickly without extensive prior instructions.

Another object of the invention is to provide a calculator of the type described which is accurate and yet can be formed of metal, plastic or paper.

Yet another object of the invention is to provide a calculator of the type described which presents to the operator a cumulative total of the additions and/or subtractions of small numbers which may be either in fraction or decimal form.

Figure 2:
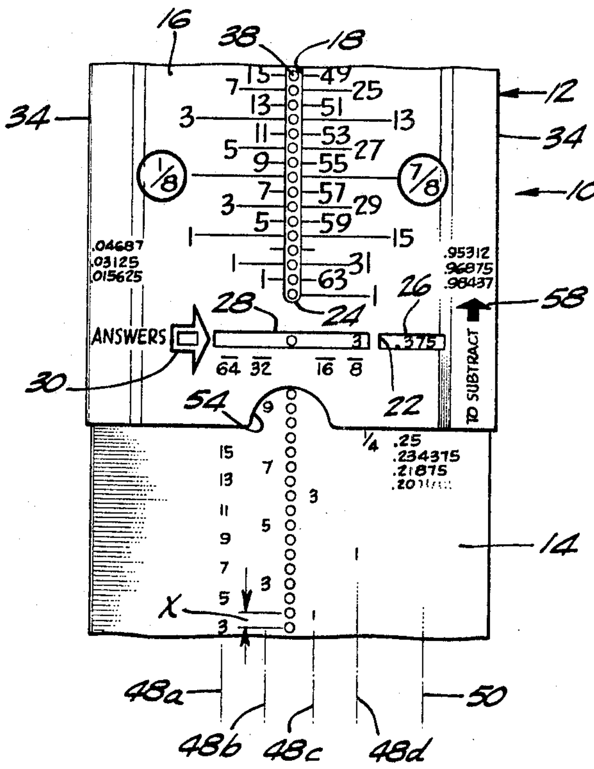

These and other objects and advantages of the invention will appear and be brought out more fully in the following specification reference being had to the accompanying drawing in which:

FIGURE 1 is a perspective view of the calculator according to the invention showing for descriptive purposes one choice of notation and arrangement of scales; and FIGURE 2 is a partial plan view of a calculator of FIGURE 1 and serves in explaining the invention.

Referring more particularly to the drawing, shown there is a calculator 10 according to the invention comprising a base member 12 and a slide member 14, either or both of which may be formed in the manner to be described from sheet metal. Other sheet material such as plastic or paper may also be used if desired.

The base member 12 includes a planar surface 16 having an elongated slot 18 of predetermined length disposed along the longitudinal center line 20. A transversely disposed window 22 is also provided and extends through the base member 12 near an end 24 of the slot 18. The window 22 is divided into a decimal read out section 26 and a fractional read out section 28 for reasons described below. An additional read out section 30 may also be provided in the window 22 to display whole numbers representative of the resultant answer where a calculator similar in all respects to the calculator 10 but longer in physical length is desired.

A guide 32 is disposed along each of the sides 34 of the base member 12. The guide 32 may be formed, for example, by a U-shaped bend 36 where the preferred metallic sheet material is used. With a plastic material, the guide 32 may be molded in a conventional manner whereas with paper, a suitable fold partially glued or stapled to the base member 12 would suffice to form the guide 32.

The slide member 14 is movably mounted in the guides 32 and includes a plurality of small circular openings 38, each spaced equally apart by predetermined distance $x$. To provide clearance between the base member 12 and the slide member 14 in the region near the slot 18, two very flat reverse bends 40 are formed in the planar surface 16 along the sides 34 near the guides 32. With this arrangement, notations imprinted on the slide member 14 as will be described will not be marred or worn through contact with the base member 12 at the lower face of the surface 16.

The openings 38 are disposed in vertical alignment with the slot 18 when the slide member 14 is mounted in the guides 32 and the base member 12. In addition, on each side of the slot 18 there is provided a scale 44 or 46 each having graduations similarly spaced apart by an amount $x$ and numbered successively from opposite ends 24 and 42 of the slot 18. The numbering may be arranged in single or multiple columns as desired. In the embodiment of FIGURE 1, shown solely for explanatory purposes, the scales 44 and 46 appear to the left and right respectively of the slot 18 and each includes four columns to display fractions in their lowest common denominators along with a fifth column of decimal equivalents.

Each of the openings 38 of the slide member 14 is also numbered in successive order but from one end only. The numbering may be arranged in columns 48a, 48b, 48c, and 48d on either side of the openings 38 and in alignment with fractional read out section 28. The decimal equivalent may also be formed in a column 50 which is similarly aligned with the decimal read out section 26.

Thus the distance $x$ represents some small portion of slot 18 and hence can be expressed as a fraction of the length of the slot 18 or its decimal equivalent. Moreover, since the openings are numbered consecutively, the slide member 14, by inserting the point of a pencil 52 through the slot 18 and into one of the openings 38, can be moved either in the direction of the arrow 56 which is towards the end 24 of the slot 18 or in the direction of the arrow 58, which is towards the end 42 of the slot 18. Movement in the direction of the arrow 56 and 58, by virtue of the numbering on the slide member 14, results in adding and subtracting to the number previously appearing in the window 22. A series of numbers may be added or subtracted in this manner; however, in view of the finite length of the calculator 10, it may be necessary to alternately add and subtract rather than to attempt to add the proper numbers first and then subtract all of the remaining numbers accordingly.

Assume for the moment that the slot 18 is 5″ long and further that the slot 18 is divided into 64 equal divisions. This then establishes the spacing $x$ between the openings 38. It will be noted that scale 44 is numbered from the end 24 of the slot 18, the odd numbers only appearing in the fraction column under headings which are sub multiples of 64. Thus, odd numbers of 64ths appear nearest the slot 18 with the even number of 64ths appearing in the other columns at the end of slightly longer indexing lines. For example, the fraction $\frac{2}{64}$ is reduced to its lowest common denominator, namely $\frac{1}{32}$ and hence, appears as unity in the next column of numbers where again even numbers are not to be found for the same reason. The scale 46 is similarly constructed except the numbering starts at the end 42 of the slot 18. It will be noted also that the decimal equivalents of each 64th is provided imprinted on the base member 12 adjacent the sides 34 below the arrow 56 in the case of the scale 44 and above the arrow 58 in the case of the scale 46. Under the fractional read out section 28, there is also provided a notation similar to the headings of the scales 44 and 46.

As best seen in FIGURE 1, the openings 38 are numbered successively from the exposed end of the calculator 10 in a manner similar to the division of the scales 44 and 46. Thus in column 48_a_, the first and every alternate one thereafter of the openings 38 are numbered accordingly. The second and every fourth one of the openings 38 are numbered thereafter in the columns 48_b_, and in column 48_c_, the fourth and every eighth one of the openings 38 are thereafter correspondingly numbered. The column 48_d_ likewise comprises odd numbers commencing with the eighth one of the openings 38 and every sixteenth one thereafter. All of the columns 48 are disposed in alignment with the fractional read out section 28. In the column 50 which is in alignment with the decimal read out section 26 of the window 22 are the decimal equivalents of any one of the openings 38 relative to a zero reference, not shown, which may be a distance $x$ below the first opening numbered in column 48_a_.

As an example, consider the slide member 14 positioned in the guide 32 as shown in FIGURE 2 with the notation 3 appearing in the fractional read out section 28 in the column 48_d_. The 3 in the window 22 represents the numerator of a fraction whose denominator is that number imprinted on the base member 12 below the fractional read out section 28. The decimal equivalent of this fraction, namely .375, which is imprinted on the slide member 14, also appears in the decimal read out section 26 of the window 22.

Now assume that the fraction ⅛ is to be subtracted. To do this, insert the pencil 52 in the eighth opening 38 (not couting one at the end) from the end 42 of the slot 18. This is the opening 38 appearing at the end of the index line marked ⅛ surrounded by a circle and appearing in the scale 46. Having inserted the pencil 52 into the opening as instructed, the pencil 52 is then moved in the direction of the arrow 58 causing the slide member 14 to move in the same direction. When the pencil makes contact with the end 42 of the slot 18, the slide member 14 will have been repositioned and the notation, presently appearing just below the base member in FIGURE 2, namely the notation .25, will appear in the decimal read out section 26 and the corresponding fraction ¼ likewise appears in the fractional read out section 28.

The process of addition is similar to that of subtraction as just described. For example, to now add the ⅛ just subtracted, the pencil 52 is inserted in the opening 38 presently appearing at the end of the index line marked ⅛ on the scale 44. Movement now in the direction of the arrows 56 results in changing the numbers appearing in the window 22 to that as shown in FIGURE 2.

For conveniently positioning the slide member 14, an index tab 54 may be provided in the base member 12, as shown.

Thus, I have shown a calculator for adding and subtracting fractional and decimal numbers in sequece comprising a base member having a raised planar surface relative to the sides thereof, an elongated slot of predetermined length disposed along the center line, a window having a decimal read out section and a fractional read out section extending through the base member in a transverse direction near one end of the slot, a plurality of graduations extending on either side of the slot and dividing the slot into a predetermined number of fractions of an inch, the graduations being numbered consecutively on each side of the slot from opposite ends thereof, and two columns of decimal equivalents of the fractional graduations, each commencing from opposite ends and ranging between zero and unity. The calculator also includes means coupled to the base member along the sides parallel to the center line for forming a guide and further includes slide means movably mounted in the guide and including a plurality of circular openings each spaced apart a distance equivalent to that between successive graduations and along a line in alignment with the slot, the slide member further including a scale graduated in decimal equivalents similar to those of the two columns and adapted to appear at the decimal read out section of the window with the fractional equivalent simultaneously appearing at the fractional read out section of the window, the window displaying the cumulative sum and difference of numbers being sequentially added and subtracted respectively as the slide member moves in correspondingly opposing directions and by an amount representative of the graduations adjacent to the slot.

It should be clear that the specific embodiment shown in the drawings as to the choice of the scales 44 and 46 and as to the length of the slot 18 as described above were shown for explanatory purposes only.

While I have herein shown and described my invention in what I have conceived to be the most practical and preferred embodiment, it is recognized that departure may be made therefrom within the scope of my invention, which is not to be limited to the details disclosed herein but is to be accorded the full scope of the claim so as to embrace any and all equivalent devices and methods.

I claim:

A digital adder-subtractor which is particularly adapted for adding or subtracting fractions and indicating the summation thereof in decimal form, comprising, in combination:

an elongated substantally flat base member;
an elongated substantially flat slide member;
said members being mutually disposed in longitudinally slidable relationship, said base member being made of sheet metal and having inturned longitudinal edges forming guides within which the longitudinal edges of said slide member are received;
said base member having an elongated slot extending longitudinally through a substantial portion of the length thereof, and said slide member having a row of equally spaced actuating holes formed therein and transversely aligned with said slot so as to be adapted to receive a pointer inserted through said slot;

said base member having a first fraction scale written along one side of said slot, commencing at one end thereof and progressing linearly toward the other end thereof;

said base member also having a second fraction scale, identical to said first fraction scale, but written on the other side of said slot in an inverted relationship;

said base member having a pair of windows formed therein for displaying summation figures carried by the surface of said slide member;

said slide member having a pair of summation scales written thereon, the successive markings of which are adapted to be successively displayed in said windows, one of said summation scales representing fractional values and the other thereof representing the corresponding decimal values; said base member having two longitudinally extending reverse bends formed therein so that the transverse portion of said base member lying above said scale markings on said slide member is physically spaced from the surface of said slide member; whereby the insertion of a pointer through said slot into one of said actuating holes, and movement of the pointer to an end of said slot, causes an addition or subtraction to the summation figures displayed in said windows according to the distance traversed on the corresponding one of said fraction scales.

References Cited by the Examiner

UNITED STATES PATENTS

| | | | |
|---|---|---|---|
| 733,054 | 7/1903 | Landing ------------ | 235—89 |
| 2,223,612 | 12/1940 | Grundlehner --------- | 235—65 |

RICHARD B. WILKINSON, *Primary Examiner.*

LOUIS J. CAPOZI, *Examiner.*

T. J. ANDERSON, *Assistant Examiner.*